US012472497B2

(12) United States Patent
Liu et al.

(10) Patent No.: US 12,472,497 B2
(45) Date of Patent: Nov. 18, 2025

(54) RECIRCULATION MECHANISM USING ELASTIC MEMBRANE

(71) Applicant: THE REGENTS OF THE UNIVERSITY OF CALIFORNIA, Oakland, CA (US)

(72) Inventors: Yujia Liu, Irvine, CA (US); Marc Madou, Irvine, CA (US); Roya Shiri, Irvine, CA (US); Alfonso Shin, Irvine, CA (US); Snehan Peshin, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 694 days.

(21) Appl. No.: 17/721,651

(22) Filed: Apr. 15, 2022

(65) Prior Publication Data

US 2022/0331799 A1 Oct. 20, 2022

Related U.S. Application Data

(60) Provisional application No. 63/175,893, filed on Apr. 16, 2021.

(51) Int. Cl.
*B01L 3/00* (2006.01)

(52) U.S. Cl.
CPC ... *B01L 3/502738* (2013.01); *B01L 3/502746* (2013.01); *B01L 2300/0806* (2013.01); *B01L 2300/0864* (2013.01); *B01L 2300/123* (2013.01)

(58) Field of Classification Search
CPC ......... B01L 3/502738; B01L 3/502746; B01L 2300/0806; B01L 2300/0864;
(Continued)

(56) References Cited

U.S. PATENT DOCUMENTS

2005/0136545 A1* 6/2005 Schmid ............ G01N 35/00069 436/63
2009/0075390 A1* 3/2009 Linder .................. A61L 2/0082 422/69

(Continued)

FOREIGN PATENT DOCUMENTS

DE 102013203293 B4 1/2016
KR 10-2014-0019429 A 2/2014

OTHER PUBLICATIONS

Aeinehvand et al., Latex micro-balloon pumping in centrifugal microfluidic platforms, 2014, Lab Chip, 14, 988 (Year: 2014).*

(Continued)

*Primary Examiner* — Jennifer Wecker
*Assistant Examiner* — Steven Ray Castaneda
(74) *Attorney, Agent, or Firm* — NGUYEN TARBET IP LAW

(57) ABSTRACT

The present invention is directed to a recirculation system for use in microfluidic centrifugal disc platforms for reusing and mixing an entire sample. The present invention features a system comprising a reservoir, an input channel, a detection array, a pressure chamber, and a recirculation channel connecting the pressure chamber to the reservoir. The recirculation channel may have a resistance lower than the channel upstream resistance. When the CD platform spins at a high RPM, the liquid may be directed from the reservoir into the pressure chamber. When the RPM of the CD platform decreases rapidly, the liquid may be directed from the pressure chamber through the channel and through the recirculation channel to the reservoir, such that the liquid travels through the recirculation channel faster than the liquid travels through the channel.

20 Claims, 6 Drawing Sheets

(58) Field of Classification Search
CPC ....... B01L 2300/123; B01L 2300/0819; B01L 2300/088; B01L 2300/0883; B01L 2400/0409; B01L 2400/0487; B01L 3/50273
See application file for complete search history.

(56) References Cited

U.S. PATENT DOCUMENTS

| | | | |
|---|---|---|---|
| 2012/0291565 | A1 | 11/2012 | Ludowise et al. |
| 2014/0134631 | A1 | 5/2014 | Clime et al. |
| 2015/0233916 | A1 | 8/2015 | Melanson et al. |
| 2017/0036208 | A1 | 2/2017 | Veres et al. |

OTHER PUBLICATIONS

Noroozi et al. "A multiplexed immunoassay system based upon reciprocating centrifugal microfluidics." Review of Scientific Instruments 82.6 (2011).
EPO, "Extended European Search Report", issued in connection with European Patent Application No. 22789083.7 dated Feb. 7, 2025, 10 pages.
EPO, "Supplementary European Search Report", issued in connection with European Patent Application No. 22789083.7 dated Feb. 25, 2025, 1 page.

* cited by examiner

RECIRCULATION MECHANISM USING ELASTIC MEMBRANE

CROSS-REFERENCES TO RELATED APPLICATIONS

This application is a non-provisional and claims benefit of U.S. Provisional Application No. 63/175,893 filed Apr. 16, 2021, the specification of which is incorporated herein in its entirety by reference

FIELD OF THE INVENTION

The present invention is directed to a recirculation system for use in microfluidic centrifugal disc platforms for reusing and mixing an entire sample.

BACKGROUND OF THE INVENTION

Limit of detection is one of the key restriction factors in point of care diagnostic devices. The target molecules in the patient sample are often too scarce to be detected. Ways to overcome the issue include molecular amplification, increasing sample amount, and using more sensitive instruments, which is not practical in point-of-care scenarios.

One of the current solutions for enhancing the limit of detection was previously reported as a reciprocation system. The reciprocation system of multiplexing immunoassay provides maximum exposure of the antigen array to the serum solution to promote target hybridization without increasing the sample amount [Noroozi, Zahra, et al. “A multiplexed immunoassay system based upon reciprocating centrifugal microfluidics.” Review of Scientific Instruments 82.6 (2011): 064303]. However, the method only partially uses the sample due to the ‘back and forth’ motion that only allows the middle part of the sample to be exposed to the detection array. Meanwhile, the reciprocation system does not mix the sample due to the low Reynolds number, resulting in locally depleting the target molecules and hindering the assay accuracy. Thus, there exists a present need for a centrifugal disc (CD) recirculation system capable of using the entire liquid sample and sufficiently mixing the liquid sample as it passes through the system.

BRIEF SUMMARY OF THE INVENTION

It is an objective of the present invention to provide systems and methods that allow for reusing and mixing an entire sample in a centrifugal disc platform, as specified in the independent claims. Embodiments of the invention are given in the dependent claims. Embodiments of the present invention can be freely combined if they are not mutually exclusive.

The present invention features a system for observing and recirculating liquid in a microfluidic centrifugal disc (CD) platform to recycle a sample contained in the liquid. In some embodiments, the system may comprise a reservoir fluidly connected to the CD platform capable of spinning the liquid at various speeds. The system may further comprise an input channel fluidly connected to the CD platform with asymmetric resistance. The system may further comprise a detection array fluidly connected to the channel for observing the sample contained in the liquid.

The system may further comprise a pressure chamber comprising an elastic membrane. The liquid directed into the pressure chamber may inflate the elastic membrane to store pneumatic energy. The system may further comprise a recirculation channel fluidly connecting the pressure chamber to the reservoir. The recirculation channel may have a resistance lower than the channel upstream resistance. When the CD platform spins at a high RPM, the liquid may be directed from the reservoir downstream through the input channel, over the detection array, and into the pressure chamber such that the elastic membrane inflates and stores pneumatic energy. When the RPM of the CD platform rapidly decreases from the high RPM to a low RPM, the liquid may be directed by a release of the pneumatic energy stored in the pressure chamber from the pressure chamber upstream through the channel and the recirculation channel to the reservoir, such that the liquid travels through the recirculation channel faster than the liquid travels through the channel.

The present invention features a method for observing and recirculating liquid in a microfluidic CD platform to recycle a sample contained in the liquid. In some embodiments, the method may comprise filling a reservoir fluidly connected to the CD platform with the liquid and actuating the CD platform at a high RPM such that the liquid travels from the CD platform to an input channel fluidly connected to the CD platform. The input channel may have asymmetric resistance. The method may further comprise directing the liquid through the input channel to a detection array and observing the sample contained in the liquid. The method may further comprise directing the liquid from the detection array to a pressure chamber, such that the liquid inflates an elastic membrane of the pressure chamber and stores pneumatic energy. The method may further comprise decreasing rapidly the RPM of the CD platform to a low RPM such that the pneumatic energy stored in the pressure chamber is released, and directing, by the release of the pneumatic energy, the liquid from the pressure chamber upstream through the channel and a recirculation channel to the reservoir. The recirculation channel resistance is lower than the channel upstream resistance.

The recirculation mechanism moves the sample on the centrifugal microfluidic CD in a circular fashion, which allows all the liquid to flow through the detection area repeatedly. It maximized the utilization of the sample and promoted mixing compared to reciprocating mechanisms. Besides, this novel mechanism enables other detection methods such as flow injection analysis, which requires a large amount of sample.

One of the unique and inventive technical features of the present invention is the use of an elastic membrane for storing pneumatic energy. Without wishing to limit the invention to any theory or mechanism, it is believed that the technical feature of the present invention advantageously provides for the recirculation of a liquid sample in a CD platform while also mixing the sample, as well as allowing for inward pumping in the present invention. None of the presently known prior references or work has the unique inventive technical feature of the present invention.

Furthermore, the inventive feature of the presently claimed invention is counterintuitive. The reason that it is counterintuitive is because it contributed to a surprising result. One skilled in the art would not even attempt inward pumping in a CD platform as the natural fluidic process of liquid in a CD platform causes the liquid to pump outwards in response to the high rotational energy. Surprisingly, the implementation of the elastic membrane and specific structure of the presently claimed invention allow for both outward AND inward pumping in a CD platform, something that could not be possible in any prior CD platforms. Thus, the inventive feature of the presently claimed invention contributed to a surprising result and is counterintuitive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
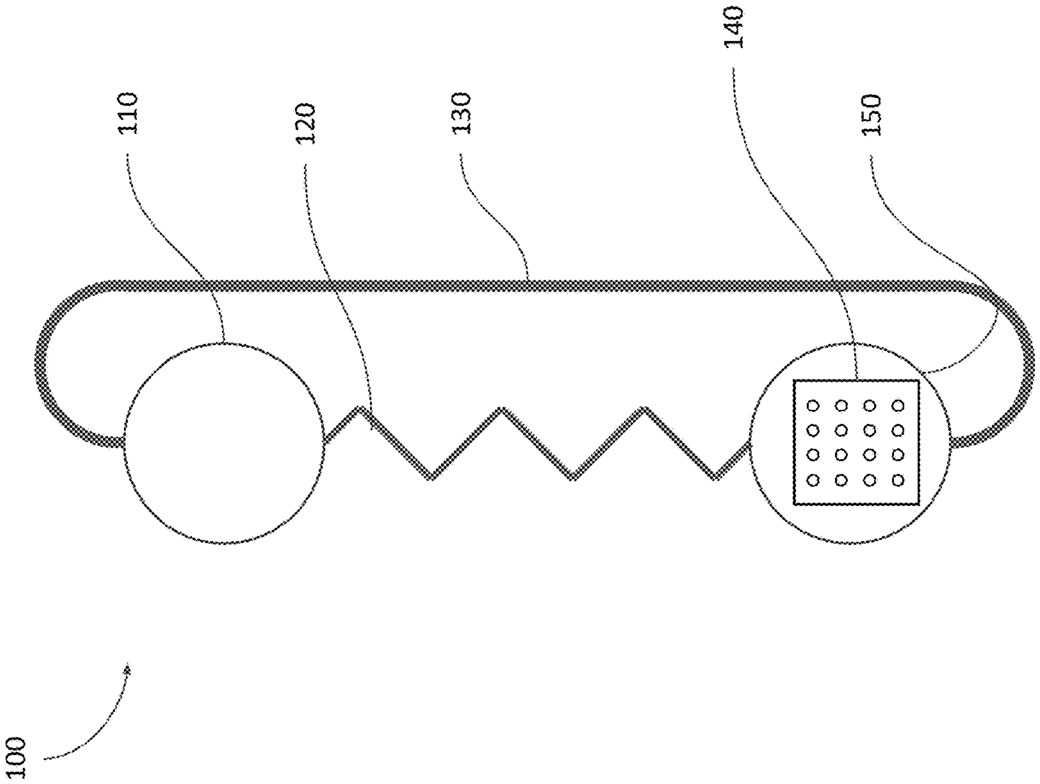
FIG. 1 shows a diagram of the microfluidic recirculation system for use in centrifugal disc platforms of the presently claimed invention.

Following is a list of elements corresponding to a particular element referred to herein:

100 recirculation system
110 reservoir
120 input channel
130 recirculation channel
140 detection array
150 pressure chamber
155 elastic membrane
157 ring adhesive
160 centrifugal disc platform
165 bottom centrifugal disc component
300 adhesive The present invention provides a recirculation mechanism for mixing and reusing the liquid in microfluidic systems on CD platforms. The main advantage of this system is that it provides a circular movement of the sample in a centrifugal microfluidic system to recycle the sample. This enables a variety of detection methods that were not able to perform on CD before due to limited sample volume, such as flow injection analysis. Besides the high binding efficiency of target molecules, it also provides efficient mixing capability compared to the traditional reciprocation mechanism.

FIG. 1 shows the solidwork design and a conceptual diagram of the claimed device. The recirculation mechanism is achieved with the centrifugal disk described in the figures.

It contains 5 major components: 1. Top reservoir with volume V1, 2. channel with asymmetric resistance (R1 and R1'), 3. recirculating channel with low resistance R2, 4. detection array, and 5. bottom reservoir with elastic membrane and volume V2. To be noted, the geometries are designed so that |R1'|>>|R2| and V1>>V2.

Figures 2A, 2B, 2C, 2D:
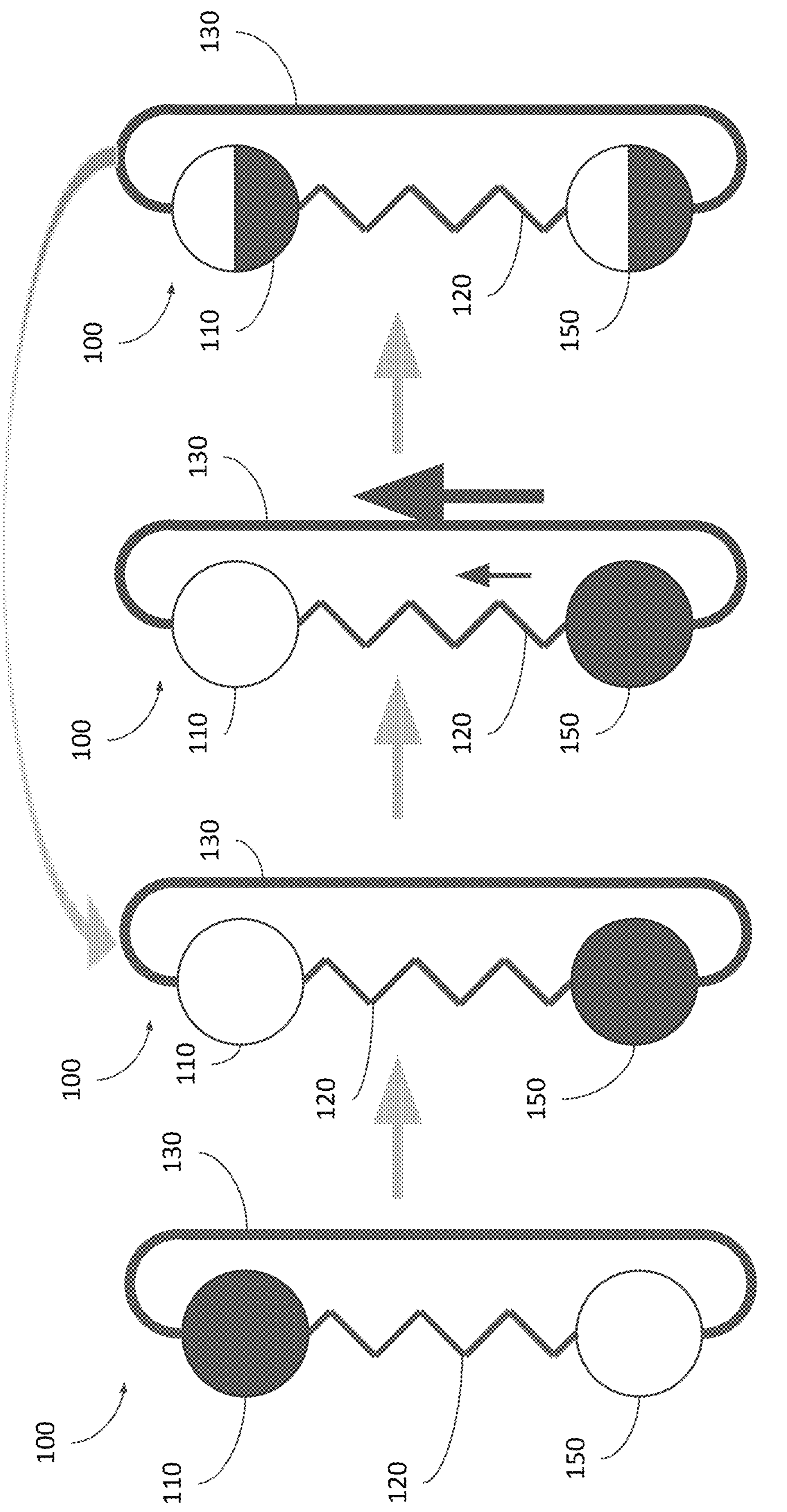
FIGS. 2A-2D show a series of diagrams of a method of recirculating fluid in a centrifugal disc platform of the presently claimed invention.

FIGS. 2A-2D demonstrate the realization of the recirculation mechanism using 4 steps. FIG. 2A: The sample was filled in the top reservoir. FIG. 2B: The CD will be spun at high rpm (4000-6000 rpm). The sample will flow through the channel and reach the detection array and the bottom reservoir to inflate the elastic membrane and store pneumatic energy in the pressure chamber. FIG. 2C: Decrease the RPM rapidly (~10000 rpm/s to reach 0-10 rpm) to release the energy from the pressure chamber. Liquid tends to flow faster in the low resistance recirculation channel compared to the channel. FIG. 2D: The liquid will partially be recycled to the reservoir and ready for the next recirculation. By repeating the steps in FIGS. 2B-2D, the full sample can be reused for as many cycles as wanted.

Figure 3:
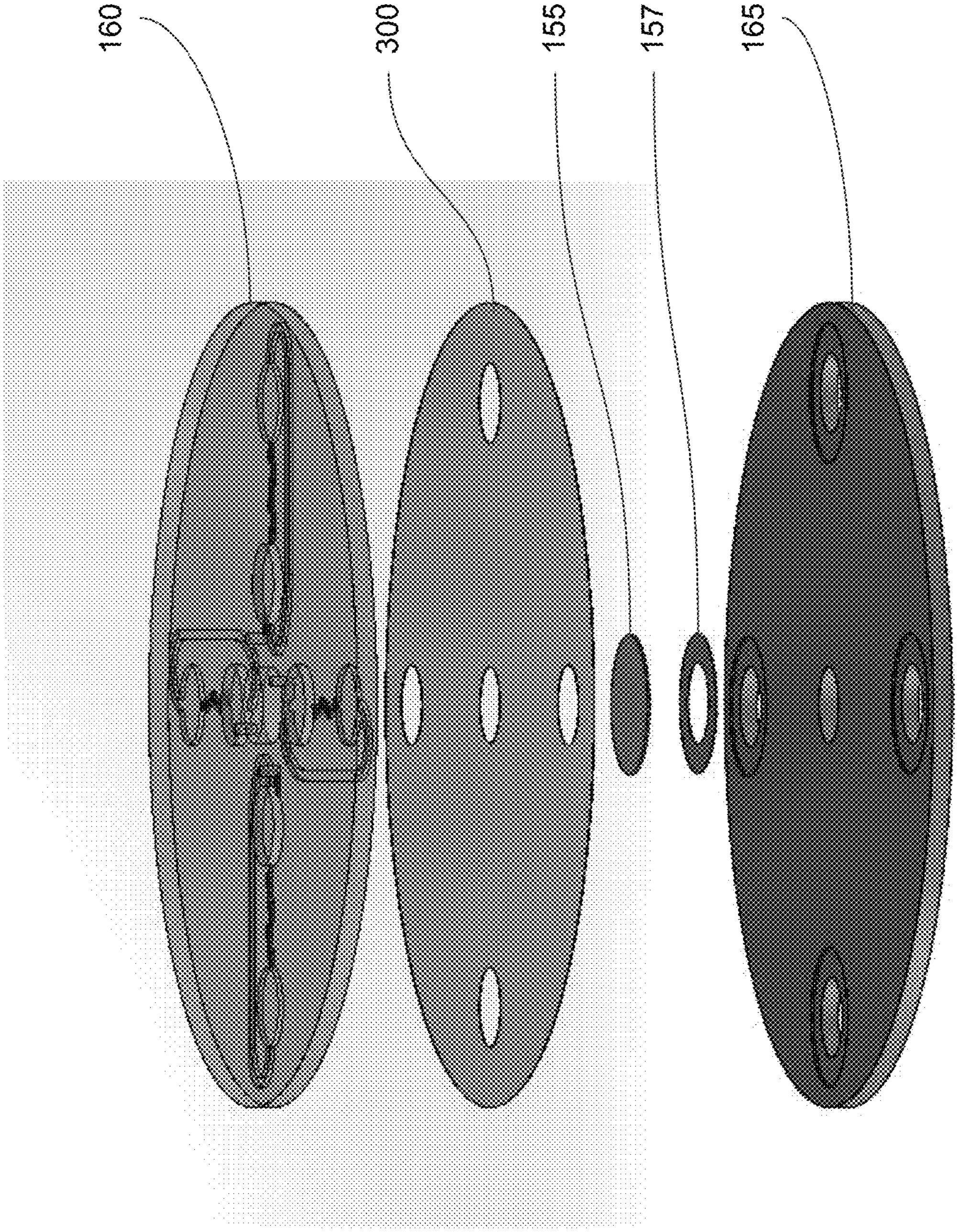
FIG. 3 shows an exploded view of a centrifugal disc platform to be paired with the recirculation system of the presently claimed invention.
Figure 4D:
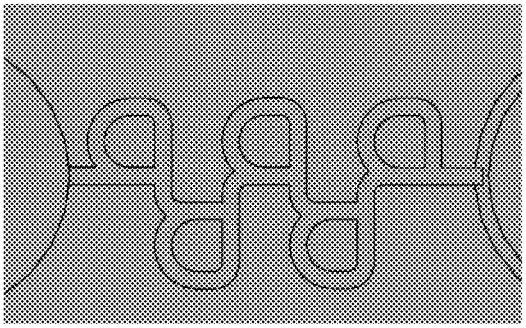
FIGS. 4A-4D show a plurality of channel configurations and shapes in the recirculation system of the presently claimed invention.
Figure 4C:
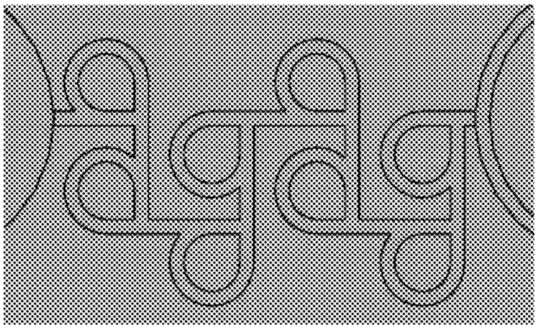
Figure 4B:
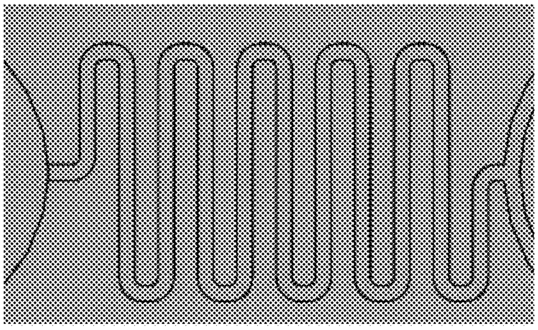
Figure 4A:
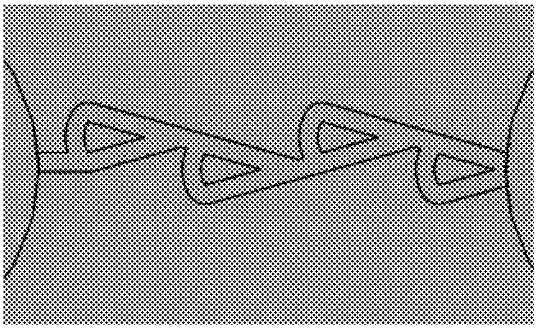
Figures 5B, 5C, 5D, 5E:
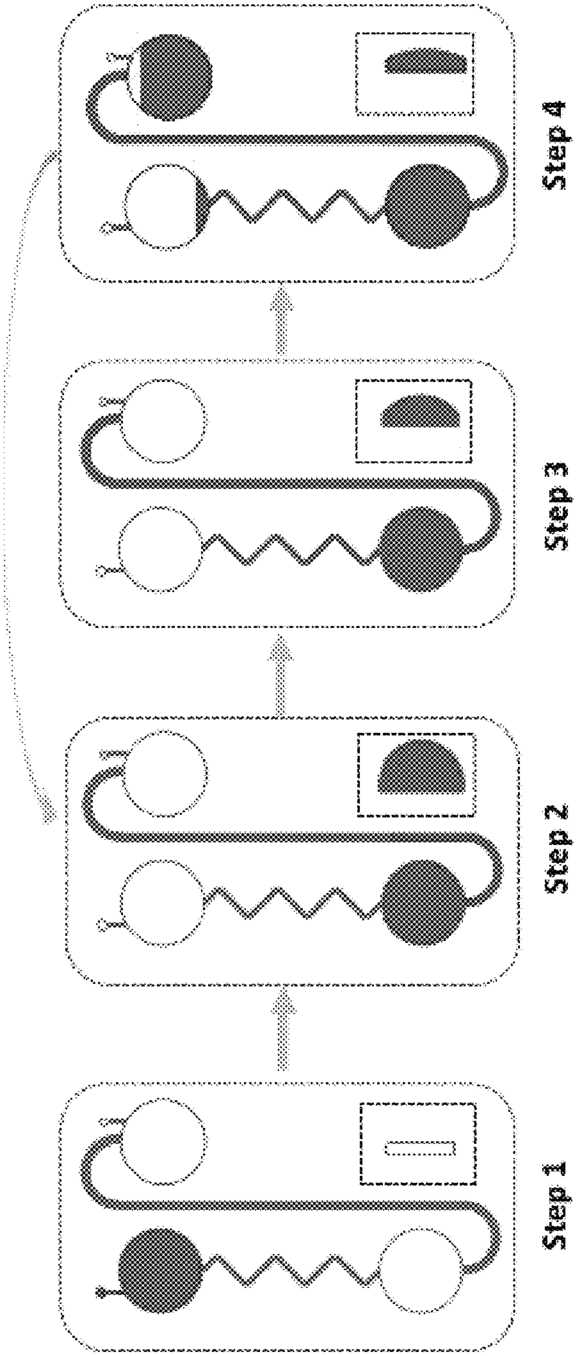
FIGS. 5B-5E show a series of diagrams of a method for inward pumping in the centrifugal disc platform of the presently claimed invention.
Figure 5A:
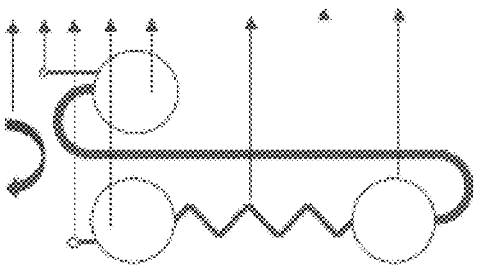
FIG. 5A shows a schematic of an inward pumping embodiment of the microfluidic recirculation system of the presently claimed invention.
Figure 6A:
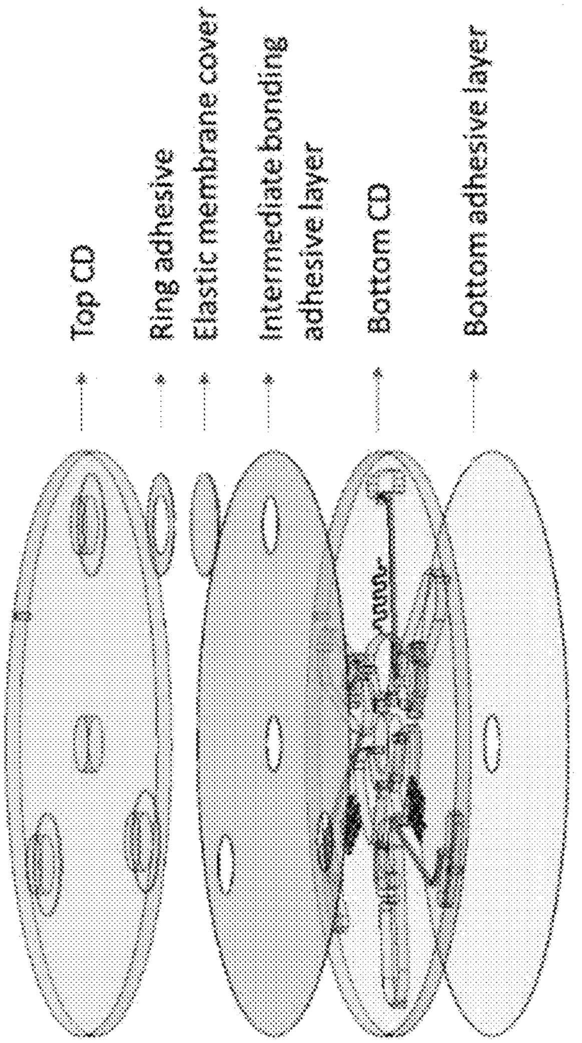
FIG. 6A shows an exploded view of a centrifugal disc platform to be paired with the recirculation system capable of inward pumping of the presently claimed invention.
Figure 6B:
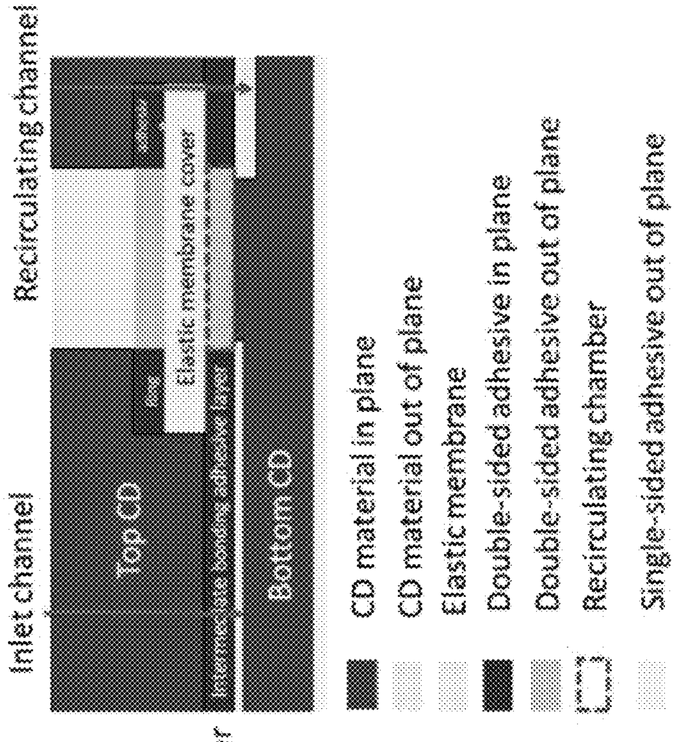
FIG. 6B shows a schematic cross-sectional view of the recirculation chamber of the inward pumping embodiment of the presently claimed invention.

FIG. 3 provides an exploded view of the centrifugal disk. FIGS. 4A-4D show a list of designs that can be used as the channel. They not only have high resistance R1', but also provide proper mixing when the sample is transferred from the reservoir to the pressure chamber.

Referring now to FIG. 1, the present invention features a system (100) for observing and recirculating liquid in a microfluidic centrifugal disc (CD) platform (160) to recycle a sample contained in the liquid. In some embodiments, the system (100) may comprise a reservoir (110) containing the liquid fluidly connected to the CD platform (160) and having a first volume. The liquid may be fed from the reservoir (110) to the CD platform (160). The system (100) may further comprise the CD platform (160) capable of spinning the liquid at various speeds. The system (100) may further comprise an input channel (120) fluidly connected to the CD platform (160). A downstream path of the input channel (120) may have a first resistance. An upstream path of the input channel (120) may have a second resistance, such that the first resistance is lower than the second resistance. The system (100) may further comprise a detection array (140) fluidly connected to the input channel (120). The detection array (140) may observe the sample contained in the liquid.

The system (100) may further comprise a pressure chamber (150) fluidly connected to the detection array (140) comprising an elastic membrane (155) and having a second volume. The liquid directed into the pressure chamber (150) may inflate the elastic membrane (155) to store pneumatic energy. The second volume may be less than the first volume. The system (100) may further comprise a recirculation channel (130) fluidly connecting the pressure chamber (150) to the reservoir (110). The recirculation channel (130) may have a third resistance such that the third resistance is lower than the second resistance. In some embodiments, the input channel (120) may have an overall higher resistance than the recirculation channel (130).

When the CD platform (160) spins at a high RPM, the liquid may be directed from the reservoir (110) downstream through the input channel (120), over the detection array (140), and into the pressure chamber (150) such that the elastic membrane (155) inflates and stores pneumatic energy. When the RPM of the CD platform (160) rapidly decreases from the high RPM to a low RPM, the liquid may be directed by a release of the pneumatic energy stored in the pressure chamber (150) from the pressure chamber (150) upstream through the input channel (120) and the recirculation channel (130) to the reservoir (110), such that the liquid travels through the recirculation channel (130) faster than the liquid travels through the input channel (120).

In some embodiments, the high RPM and the low RPM may be dependent on one or more mechanical properties of the elastic membrane (155), such as Young's modulus, membrane size, shape, and durability. The RPM may be additionally dependent on the size of the CD. This may allow for the flexibility of a broader range of RPMs implemented by the presently claimed invention. In some embodiments, the high RPM is 4000 to 6000 RPM, the low RPM is 0 to 10 RPM, and the rapid decrease of RPM is a decrease of about 10000 RPM/s. In some embodiments, the high RPM is greater than 3000 RPM. In some embodiments, the input channel (120) may be capable of mixing the sample into the liquid as the liquid passes downstream through the input channel (120). A shape of the input channel (120) may be selected from a group comprising a tesla valve shape, a serpentine shape, and a combination thereof. The detection array (140) may comprise a plurality of microarrays and implement flow injection analysis to observe the sample contained in the liquid. The CD platform (160) may comprise a top CD and a bottom CD (165) connected by an adhesive (300). The CD platform (160) may further comprise a ring adhesive disposed between the elastic membrane (155) and the bottom CD (165). In some embodiments, the elastic membrane (155) may have a diameter at most equal to the diameter of the CD platform (160). In some embodiments, the elastic membrane (155) may have a diameter at least equal to the diameter of the ring adhesive (157). Changing the diameter of the elastic membrane (155) may result in different inward pumping efficience and may affect the transferred volume of fluid per pumping cycle. In some embodiments, the reservoir (110) is a component of the CD platform (160). In other embodiments, the reservoir (110) is an external component from the CD platform (160).

Referring now to FIGS. 2A-2D, the present invention features a method for observing and recirculating liquid in a microfluidic CD platform (160) to recycle a sample contained in the liquid. In some embodiments, the method may comprise filling a reservoir (110) fluidly connected to the CD platform (160) with the liquid, such that the liquid travels from the reservoir (110) to the CD platform (160). The method may further comprise actuating the CD platform (160) at a high RPM such that the liquid travels from the CD platform (160) to an input channel (120) fluidly connected to the CD platform (160). A downstream path of the input channel (120) may have a first resistance, and an upstream path of the input channel (120) may have a second resistance, such that the first resistance is lower than the second resistance. The method may further comprise directing the liquid through the input channel (120) to a detection array (140) fluidly connected to the input channel (120), and observing, by the detection array (140), the sample contained in the liquid. The method may further comprise directing the liquid from the detection array (140) to a pressure chamber (150), such that the liquid inflates an elastic membrane (155) of the pressure chamber (150) and stores pneumatic energy. The method may further comprise decreasing rapidly the RPM of the CD platform (160) to a low RPM such that the pneumatic energy stored in the pressure chamber (150) is released and directing, by the release of the pneumatic energy, the liquid from the pressure chamber (150) upstream through the input channel (120) and a recirculation channel (130) fluidly connecting the pressure chamber (150) to the reservoir (110). The recirculation channel (130) may have a third resistance lower than the second resistance. In some embodiments, the input channel (120) may have an overall higher resistance than the recirculation channel (130). In some embodiments, the method may further comprise steps for fully recirculating the liquid, comprising repeating the steps of the method until an entirety of the liquid has been directed through the microfluidic components back into the reservoir (110).

In some embodiments, the high RPM and the low RPM may be dependent on one or more mechanical properties of the elastic membrane (155), such as Young's modulus, membrane size, shape, and durability. The RPM may be additionally dependent on the size of the CD. This may allow for the flexibility of a broader range of RPMs implemented by the presently claimed invention. In some embodiments, the high RPM is 4000 to 6000 RPM, the low RPM is 0 to 10 RPM, and the rapid decrease of RPM is a decrease of about 10000 RPM/s. In some embodiments, the high RPM is greater than 3000 RPM. In some embodiments, the input channel (120) may be capable of mixing the sample into the liquid as the liquid passes downstream through the input channel (120). A shape of the input channel (120) may be selected from a group comprising a tesla valve shape, a serpentine shape, and a combination thereof. The detection array (140) may comprise a plurality of microarrays and implement flow injection analysis to observe the sample contained in the liquid. The CD platform (160) may comprise a top CD and a bottom CD (165) connected by an adhesive (300). The CD platform (160) may further comprise a ring adhesive disposed between the elastic membrane (155) and the bottom CD (165). In some embodiments, the elastic membrane (155) may have a diameter at most equal to the diameter of the CD platform (160). In some embodiments, the elastic membrane (155) may have a diameter at least equal to the diameter of the ring adhesive (157).

In some embodiments, the present invention features a microfluidic CD system capable of inward pumping. The system may comprise a CD platform having a center of rotation, a loading chamber comprising an inlet hole, a recirculating chamber comprising an elastic membrane fluidly connected to the loading chamber by an inlet channel with high fluidic resistance, and a collection chamber fluidly connected to the recirculating chamber by a recirculating channel with low fluidic resistance. The collection chamber may comprise a ventilation hole. A liquid may be introduced to the loading chamber through the inlet hole. The CD may then spin at a high RPM to propel the liquid into the recirculating chamber and inflate the elastic membrane. Upon fast deceleration, the return of the elastic membrane to its initial position may push the liquid from the recirculating chamber towards the center of the CD platform through two channels with distinct resistances. The wider recirculation channel has a lower fluidic resistance than the narrower winding inlet channel. As the volumetric flow rate of liquid is much higher in the channel with a lower resistance recirculating channel, most of the liquid is pumped inwards through the recirculating channel and arrives at the collection chamber. The liquid left in the loading chamber and recirculating chamber can be further pumped inwards by repeating spinning and decelerating the CD platform, denoted as the recirculating cycles. This inward pumping method may allow for the transport of a liquid in a CD platform from an outer position to an inner position, contrary to prior CD platforms that only allow for the transport of fluids from an inner position to an outer position.

In some embodiments, the detection array (140) may be capable of both detecting the presence of the liquid at a point in the CD platform (160) and monitoring the fluidic properties of the liquid within the CD platform (160). The detection array (140) in general may provide for a detection method for biological assays.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system (100) for observing and recirculating liquid in a microfluidic centrifugal disc (CD) platform (160) in order to recycle a sample contained in the liquid, the system (100) comprising:

a. the CD platform (160) capable of spinning the liquid at various speeds, the CD platform (160) comprising:
   i. a reservoir (110) containing the liquid having a first volume;
   ii. an input channel (120) fluidly connected to the reservoir (110), wherein the input channel (120) has a first resistance;
   iii. a pressure chamber (150) fluidly connected to the reservoir (110) by the input channel (120), the pressure chamber (150) comprising an elastic membrane (155) and having a second volume, wherein the liquid directed into the pressure chamber (150) inflates the elastic membrane (155) in order to store pneumatic energy, wherein the second volume is less than the first volume; and
   iv. a recirculation channel (130) fluidly connecting the pressure chamber (150) to the reservoir (110), wherein the recirculation channel (130) has a second resistance, wherein the second resistance is lower than the first resistance;

wherein the liquid, upon the CD platform (160) spinning at a high RPM, is directed from the reservoir (110) downstream through the input channel (120) into the pressure chamber (150) such that the elastic membrane (155) inflates and stores pneumatic energy;

wherein the liquid, upon a rapid decrease of RPM of the CD platform (160) from the high RPM to a low RPM, is directed, by a release of the pneumatic energy stored in the pressure chamber (150), from the pressure chamber (150) upstream through the input channel (120) and through the recirculation channel (130) to the reservoir (110), wherein the liquid travels through the recirculation channel (130) faster than the liquid travels through the input channel (120); and wherein the reservoir (110), the input channel (120), the pressure chamber (150), and the recirculation channel (130) are fluidically connected in a closed loop configuration.

2. The system (100) of claim 1, wherein the high RPM and the low RPM are dependent on one or more mechanical properties of the elastic membrane (155).

3. The system (100) of claim 2, wherein the high RPM is higher than 3000 RPM, wherein the low RPM is 0 to 10 RPM, wherein the rapid decrease of RPM is a decrease of about 10000 RPM/s.

4. The system (100) of claim 1, wherein the input channel (120) is capable of mixing the sample into the liquid as the liquid passes downstream through the input channel (120).

5. The system (100) of claim 1, wherein a shape of the input channel (120) is selected from a group comprising a tesla valve shape, a serpentine shape, and a combination thereof.

6. The system (100) of claim 1 further comprising a detection array (140) fluidly connected to the input channel (120), wherein the detection array (140) observes the sample contained in the liquid through flow injection analysis in order to observe the sample contained in the liquid.

7. The system (100) of claim 6, wherein the detection array (140) is capable of detecting a presence of the liquid at a point in the CD platform (160) and monitoring fluidic properties of the liquid within the CD platform (160).

8. The system (100) of claim 1, wherein a downstream path of the input channel (120) has a downstream resistance, wherein an upstream path of the input channel (120) has an upstream resistance, wherein the downstream resistance is lower than the upstream resistance.

9. The system (100) of claim 1, wherein a diameter of the elastic membrane (155) is at most equal to a diameter of the CD platform (160).

10. A method for observing and recirculating liquid in a microfluidic CD platform (160) in order to recycle a sample contained in the liquid, the method comprising:

a. filling a reservoir (110) of the CD platform (160) with the liquid;

b. actuating the CD platform (160) at a high RPM such that the liquid travels from the reservoir (110) to an input channel (120) fluidly connected to the reservoir (110), wherein the input channel (120) has a first resistance;

c. directing the liquid through the input channel (120) to a pressure chamber (150), such that the liquid inflates an elastic membrane (155) of the pressure chamber (150) and stores pneumatic energy;

d. decreasing rapidly the RPM of the CD platform (160) to a low RPM such that the pneumatic energy stored in the pressure chamber (150) is released;

e. directing, by the release of the pneumatic energy, the liquid from the pressure chamber (150) upstream through the input channel (120) and through a recirculation channel (130) fluidly connecting the pressure chamber (150) to the reservoir (110), wherein the recirculation channel (130) has a second resistance, wherein the second resistance is lower than the first resistance; and wherein the reservoir (110), the input channel (120), the pressure chamber (150), and the recirculation channel (130) are fluidically connected in a closed loop configuration.

11. The method of claim 10 further comprising steps for fully recirculating the liquid, comprising repeating steps a-e until an entirety of the liquid has been directed through microfluidic components back into the reservoir (110);

wherein the microfluidic components comprise the reservoir (110), the input channel (120), the pressure chamber (150), and the recirculation channel (130).

12. The method of claim 10, wherein the high RPM and the low RPM are dependent on one or more mechanical properties of the elastic membrane (155).

13. The method of claim 12, wherein the high RPM is more than 3000 RPM, wherein the low RPM is 0 to 10 RPM, wherein the rapid decrease of RPM is a decrease of about 10000 RPM/s.

14. The method of claim 10, wherein the input channel (120) is capable of mixing the sample into the liquid as the liquid passes downstream through the input channel (120).

15. The method of claim 10, wherein a shape of the input channel (120) is selected from a group comprising a tesla valve shape, a serpentine shape, and a combination thereof.

16. The method of claim 10 further comprising:

a. after the liquid travels from the reservoir (110) to the input channel (120) fluidly connected to the reservoir (110), directing the liquid through the input channel (120) to a detection array (140) fluidly connected to the input channel (120);

b. observing, by the detection array (140), the sample contained in the liquid;

c. directing the liquid from the detection array (140) to the pressure chamber (150);

wherein an amount of the sample contained in the liquid is substantially unchanged after observation by the detection array (140).

17. The method of claim 16, wherein the detection array (140) implements flow injection analysis in order to observe the sample contained in the liquid.

18. The method of claim 16, wherein the detection array (140) is capable of detecting a presence of the liquid at a point in the CD platform (160) and monitoring fluidic properties of the liquid within the CD platform (160).

19. The method of claim 10, wherein a downstream path of the input channel (120) has a downstream resistance, wherein an upstream path of the input channel (120) has an upstream resistance, wherein the downstream resistance is lower than the upstream resistance.

20. The method of claim 10, wherein a diameter of the elastic membrane (155) is at most equal to a diameter of the CD platform (160).

* * * * *